United States Patent
Ma

(10) Patent No.: US 9,804,036 B2
(45) Date of Patent: Oct. 31, 2017

(54) TEMPERATURE SENSOR CALIBRATION

(71) Applicant: Infineon Technologies AG, Neubiberg (DE)

(72) Inventor: Fan Yung Ma, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 626 days.

(21) Appl. No.: 14/308,983

(22) Filed: Jun. 19, 2014

(65) Prior Publication Data
US 2015/0369674 A1 Dec. 24, 2015

(51) Int. Cl.
*G01K 7/01* (2006.01)
*G01K 7/14* (2006.01)
*G01K 15/00* (2006.01)

(52) U.S. Cl.
CPC ........... *G01K 15/005* (2013.01); *G01K 7/015* (2013.01)

(58) Field of Classification Search
CPC ............. G01K 7/01; G01K 15/00; G01K 7/14
See application file for complete search history.

(56) References Cited

U.S. PATENT DOCUMENTS

| | | | | |
|---|---|---|---|---|
| 6,480,127 B1* | 11/2002 | Aslan | ........................ | G01K 7/01 257/467 |
| 6,808,307 B1* | 10/2004 | Aslan | ..................... | G01K 1/028 374/178 |
| 7,010,440 B1* | 3/2006 | Lillis | ........................ | G01K 7/01 327/512 |
| 7,309,157 B1* | 12/2007 | Aslan | ..................... | G01K 15/00 327/513 |
| 7,579,860 B2* | 8/2009 | Deken | ........................ | G05F 3/30 323/314 |
| 7,695,189 B2* | 4/2010 | Lim | ........................ | G01K 7/015 327/512 |
| 8,092,084 B2* | 1/2012 | Riddle | ..................... | G01K 7/24 327/513 |
| 8,167,485 B2* | 5/2012 | Lin | ........................ | G01K 7/015 327/512 |
| 8,696,199 B2* | 4/2014 | St. Pierre | ................. | G01K 7/01 257/467 |
| 8,915,646 B2* | 12/2014 | Wei | ........................ | G01K 7/34 341/155 |
| 9,411,355 B2* | 8/2016 | Cocetta | .................... | G05F 3/225 |
| 2006/0259999 A1* | 11/2006 | Zelinski | .................. | C12N 9/78 800/278 |
| 2008/0304546 A1* | 12/2008 | Lim | ........................ | G01K 7/015 374/178 |
| 2010/0329304 A1* | 12/2010 | Doorenbos | .............. | G01K 7/01 374/178 |
| 2011/0316606 A1* | 12/2011 | Ladurner | ............... | H03K 17/14 327/378 |
| 2013/0325391 A1* | 12/2013 | Kwon, II | ................. | G01K 7/01 702/130 |
| 2014/0092939 A1* | 4/2014 | Chang | .................. | G01K 15/005 374/178 |

(Continued)

*Primary Examiner* — Gail Kaplan Verbitsky
(74) *Attorney, Agent, or Firm* — Shumaker & Sieffert, P.A.

(57) ABSTRACT

Representative implementations of devices and techniques provide calibration for a chip-based temperature sensor. Two or more measurements are taken using a high resolution temperature sensor digitizer, and used to determine a calibration for the temperature sensor, based on a reference temperature value calculated from the measurements.

21 Claims, 7 Drawing Sheets

(56) References Cited

U.S. PATENT DOCUMENTS

| | | | |
|---|---|---|---|
| 2014/0341257 A1* | 11/2014 | Bernardinis | G01K 7/01 |
| | | | 374/178 |
| 2015/0117495 A1* | 4/2015 | Tiruvuru | G01K 7/006 |
| | | | 374/178 |
| 2015/0145486 A1* | 5/2015 | Bizjak | H02M 3/04 |
| | | | 323/234 |
| 2015/0346754 A1* | 12/2015 | Teo | G05F 3/30 |
| | | | 327/539 |

* cited by examiner

TEMPERATURE SENSOR CALIBRATION

BACKGROUND

The accuracy of integrated temperature sensors can potentially be limited by semiconductor process parameter variations. For example, the accuracy of bipolar-based temperature sensors may be limited by the base-emitter voltage ($V_{BE}$) variations among the devices in a batch. Likewise, high accuracy CMOS temperature sensors are typically based on substrate PNP bipolar $V_{BE}$ and $\Delta V_{BE}$, and can be subject to similar variations. The accuracy of such temperature sensors, without calibration, is commonly about +/−2° C., over the temperature range −55° C. to +125° C. This means that for temperature sensors that are design-limited by $V_{BE}$ variations, calibration is desired for an accuracy of less than +/−2° C.

To calibrate a temperature sensor, a reference temperature with accuracy better than the temperature sensor is desired. The output of the temperature sensor can then be compared to the reference temperature for calibration purposes. Calibration schemes are generally either thermal calibration schemes or electrical calibration schemes. For example, one thermal scheme includes using a temperature bath or chamber to produce a reference temperature, and a high accuracy thermometer to measure the reference temperature. The measured reference is compared to the output of the temperature sensor to be calibrated. However, it can be difficult to both control the temperature of the reference chamber environment and to accurately measure it. Additionally, it can take a relatively long time (on the order of minutes or tens of minutes, for example) for thermal contact and stabilization. This increases the cost of the test stages of the manufacturing process of each part.

In an alternate thermal process, calibrating a wafer made up of multiple sensors can spread the overhead over the multiple sensors. Additionally, the average error of a batch of sensors can be measured, and each sensor of the batch can be calibrated based on the average error. However, group calibration does not address temperature errors (which can be on the order of +/−0.5° C.) that can be due to the mechanical stress effects of packaging. Further, group calibration avoids calibrating each sensor part, but the resultant accuracy depends on the accuracy of the average error (number of samples required), the intra-batch variation, and the reproducibility.

One electrical calibration scheme includes using electrical means to measure the reference temperature, for example. However, while an electrical measurement can be fast (seconds compared to minutes), the use of such high-precision test measurement equipment in a production test environment is not trivial. Alternately, an electrical means may be used to calibrate $V_{BE}$ indirectly by calibrating the bandgap reference voltage used in the analog-to-digital converter (ADC) of the sensor. For example, the precise temperature may not be as important, since the temperature coefficient of a trimmed bandgap can be zero.

On the other hand, the bandgap has a zero temperature coefficient only at the trim temperature with curvature over the temperature range. In addition, the target reference voltage for a zero temperature coefficient calibration has some dependency on the calibration temperature and other parameters (including the ideality factor $\eta$). For a certain type of curvature corrected temperature sensor, a non-zero temperature coefficient voltage reference is needed, which then requires the temperature to be known to determine the correct trim reference voltage. In addition, for a temperature sensor ADC that uses a charge balancing technique, the reference voltage is often generated dynamically from $\Delta V_{BE}$ and $V_{BE}$ and is not available for direct measurement.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

Figure 1:
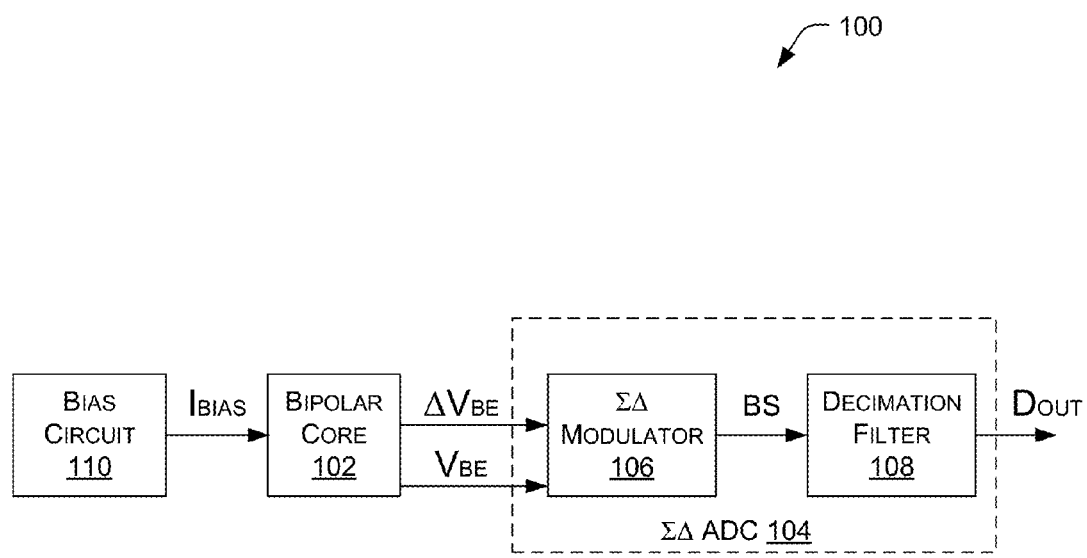
FIG. 1 is a block diagram of an example digital temperature sensor arrangement, wherein the techniques and devices disclosed herein may be applied.

Representative implementations of devices and techniques provide calibration for a chip-based temperature sensor. To calibrate a temperature sensor, a reference temperature with accuracy better than the temperature sensor is desired. The output of the temperature sensor can then be compared to the reference temperature for calibration purposes.

In various aspects, two or more measurements are taken using a high resolution temperature sensor digitizer (TSD). The reference temperature may be calculated from the measurements, based on a base-emitter voltage ($V_{BE}$) (i.e., internal reference voltage) and/or a difference in the base-emitter voltages ($\Delta V_{BE}$) of two or more bipolar devices used by the TSD. Alternately, $\Delta V_{BE}$ can also be obtained from one bipolar device biased by at least two different currents. The comparison of the reference temperature calculated and the temperature measured by the temperature sensor can be used to determine a trim for the temperature sensor. The devices and techniques described herein may be used to calibrate individual temperature sensor components (e.g., packaged or un-packaged), as well as calibrate multiple temperature sensors on a production wafer.

In an implementation, the base-emitter voltage ($V_{BE}$) and the difference in base-emitter voltages ($\Delta V_{BE}$) are inputs to an analog-to-digital converter (ADC) of the TSD. In the implementation, at least one measurement is taken with these inputs present. Additionally, one or more of the measurements are taken while substituting one of the base-emitter voltage ($V_{BE}$) or the difference in base-emitter voltages ($\Delta V_{BE}$) with a predefined external reference voltage, a derived reference voltage, or the like.

In other implementations, the difference in base-emitter voltages ($\Delta V_{BE}$) is calculated while using the base-emitter voltage ($V_{BE}$) and the predefined external reference voltage ($V_{EXT}$) as inputs for one or more of the measurements. In the implementations, the reference temperature is calculated based on the difference in base-emitter voltages ($\Delta V_{BE}$) derived.

Various implementations and techniques for calibrating a temperature sensor arrangement are discussed in this disclosure. Techniques and devices are discussed with reference to example devices and systems illustrated in the figures that use analog-to-digital converters (ADC), modulators, or like components. In some cases, sigma-delta ADC designs are shown and discussed. However, this is not intended to be limiting, and is for ease of discussion and illustrative convenience. The techniques and devices discussed may be applied to any of various modulator or ADC device designs, structures, and the like (e.g., successive-approximation ADC (SA-ADC), direct-conversion ADC, flash ADC, ramp-compare ADC, integrating ADC (also referred to as dual-slope or multi-slope ADC), counter-ramp ADC, pipeline ADC, sigma-delta ADC, time interleaved ADC, intermediate FM stage ADC, etc.), and remain within the scope of the disclosure.

Implementations are explained in more detail below using a plurality of examples. Although various implementations and examples are discussed here and below, further implementations and examples may be possible by combining the features and elements of individual implementations and examples.

Example TSD Arrangement

FIG. 1 is a block diagram of an example temperature sensor digitizer (TSD) (e.g., high resolution digital temperature sensor) arrangement 100, wherein the techniques and devices disclosed herein may be applied. In an implementation, the TSD 100 provides digital information representing a reference temperature for calibration of a temperature sensor, or a group of temperature sensors on a wafer, etc. For example, the reference temperature may be compared to a temperature measurement of a temperature sensor under test, by a test apparatus or the like, to calibrate the temperature sensor under test. Analog signals ($\Delta V_{BE}$ and $V_{BE}$) are received on the input side of an ADC 104, from a bipolar core 102, and digital results $D_{OUT}$ are output from the ADC 104.

For the purposes of this disclosure, a digital result (e.g., digital output) may be described as a digital approximation of an analog input. For example, a digital result may include a digital representation that is proportional to the magnitude of the voltage or current of the analog input(s), at a point in time and/or over a selected duration. The digital representation may be expressed in various ways (e.g., base 2 binary code, binary coded decimal, voltage values, electrical or light pulse attributes, and the like).

In an implementation, the base-emitter reference voltage $V_{BE}$ and/or the difference in base-emitter voltages $\Delta V_{BE}$ are based on two or more bipolar devices within the bipolar core 102. The bipolar devices may include bipolar junction transistors, diodes, or like devices. Alternately, the bipolar devices of the bipolar core 102 may comprise sub-threshold metal-oxide-semiconductor (MOS) devices, referencing the gate-source voltage ($V_{GS}$) of the MOS devices as the reference voltage.

As shown in FIG. 1, an example ADC 104 may include a modulator 106 and a decimation filter 108, for instance. In various implementations, the ADC 104 compares $\Delta V_{BE}$ to $V_{BE}$ via the modulator 106 and outputs $D_{OUT}$ based on the digitized comparison. As also shown in FIG. 1, the TSD 100 may include bias circuitry 110 arranged to bias the bipolar devices of the bipolar core 102. In alternate implementations, an example TSD 100 may include fewer, additional, or alternate components, including additional stages of ADCs or different types of ADCs, for example.

In various implementations, the temperature error of a temperature sensor can be determined by comparing the temperature reading of the sensor with a reference temperature derived from the TSD 100, while both are in the same thermal environment. In one implementation, the reference temperature can be derived from the difference in base-emitter voltages ($\Delta V_{BE}$), using the formula:

$$\Delta V_{BE} = (\eta kT/q) * Ln(N) \qquad \text{(Equation 1)}$$

where k is the Boltzmann constant, q is electric charge, T is absolute temperature (° Kelvin), Ln is the natural logarithm function, N is a number based on a desired design ratio (e.g., the ratio of PNP emitter areas or bias currents, for example), and η is the ideality factor (i.e., forward emission coefficient) which may deviate from unity in some CMOS technologies.

For example, once $\Delta V_{BE}$ is known, the temperature (in ° K) can be derived from Equation 1 as:

$$T = q * \Delta V_{BE} / \{\eta k * Ln(N)\} \qquad \text{(Equation 1a)}$$

For an accurate temperature T measurement in some applications, the value of η is desired to be known. A separate batch calibration is sometimes used to determine the value of η. For example, one technique for determining the value of η is via the relationship:

$$V_{BE} = (\eta kT/q) * Ln(I_C/I_S) \qquad \text{(Equation 2)}$$

where $I_C$ is the collector current and $I_S$ is the reverse saturation current of the base-emitter junction.

From the slope of $V_{BE}$ versus $Ln(I_C)$ at a known temperature T, η can be calculated, assuming that η is process dependent (the same value for each batch) but temperature independent. However, when used to model the reverse Early effect, η is temperature dependent.

Example Implementations

In various implementations, alternative techniques may be applied that use the TSD 100 to determine $\Delta V_{BE}$, and to determine a reference temperature, via equations 1 and 1a. In the implementations, the techniques will have the same inherent advantages of faster calibration time and simpler equipment set-up, relative to thermal calibration, for example. In addition, the ideality factor η contribution is also included in the techniques, making separate batch calibration unnecessary. In some implementations, the η factor can be measured as part of the calibration, which can be useful since the η value also impacts precision bandgap reference voltage performance.

Figure 2:
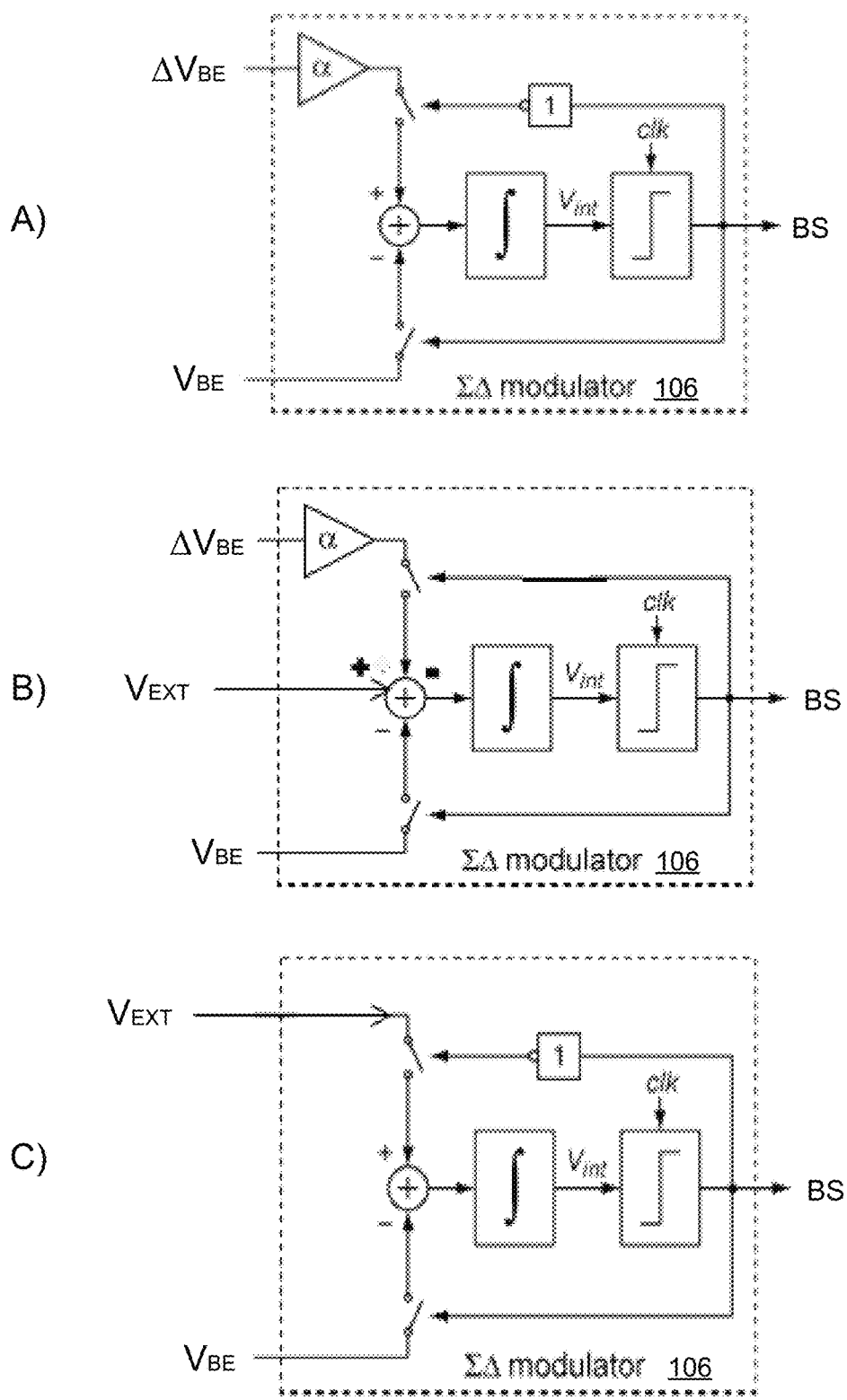
FIG. 2 includes block diagrams of three example modulator arrangements that may be used with the digital temperature sensor arrangement of FIG. 1, according to various implementations.

In one implementation, the value of $\Delta V_{BE}$ is determined by taking two measurement values of $D_{OUT}$ (values D1 and D2) using the TSD 100, as illustrated in FIG. 1. FIG. 2 includes block diagrams of three example modulator 106 arrangements that may be used with the TSD 100, according to various implementations. The modulator 106 arrangements are illustrated as sigma-delta type modulators, but this is not intended to be limiting. As mentioned above, other types or designs of modulators 106 may also be used and remain within the scope of the disclosure.

For example, the modulator 106 arrangement at FIG. 2(A) may be used with the TSD 100 to determine the first measurement D1. As shown in FIG. 2(A), the inputs to the modulator 106 include $\Delta V_{BE}$ and the reference voltage $V_{BE}$. In an implementation, the modulator 106 compares $\Delta V_{BE}$ and $V_{BE}$, and digitizes the integral, forming the output BS. The output of the modulator 106 (BS) is processed by the decimation filter 108, for example, resulting in the measurement output D1. D1 can be expressed with the formula:

$$D1 = \alpha^* \Delta V_{BE}/(\alpha^* \Delta V_{BE} + V_{BE}) \quad \text{(Equation 3)}$$

For the measurement D2, the modulator 106 at either FIG. 2(B) or 2(C) may be used with the TSD 100. In either implementation, to determine D2, an external reference voltage $V_{EXT}$ is used as an input to the modulator 106, in substitution for $\Delta V_{BE}$ or $\alpha^* \Delta V_{BE}$, which is to be in the expected voltage range of $\Delta V_{BE}$ or $\alpha^* \Delta V_{BE}$ to avoid the modulator 106 going out of range. In the case of the modulator 106 at FIG. 2(B), the modulator 106 (and ADC 104) has an additional input $V_{EXT}$, which is combined (e.g., differentiated) with the inputs $\Delta V_{BE}$ and $V_{BE}$. The result is digitized, forming the output BS, which is processed by the decimation filter 108, for example, resulting in the measurement output D2. D2 can be expressed with the formula:

$$D2 = V_{EXT}/(\alpha^* \Delta V_{BE} + V_{BE}) \quad \text{(Equation 4)}$$

Using the two measurements D1 and D2 from the TSD 100, $\Delta V_{BE}$ can be determined by the formula:

$$\Delta V_{BE} = D1^* V_{EXT}/(D2^* \alpha) \quad \text{(Equation 5)}$$

Accordingly, the reference temperature (T) is determined using equations 1 and 1a. The relative errors can be analyzed using the following formula:

$$\partial T = \partial \Delta V_{BE} \leq \partial D1 + \partial D2 + \partial V_{EXT} + \partial \alpha \quad \text{(Equation 6)}$$

where $\partial x = \Delta x/x$.

To avoid the use of the additional input to the ADC 104, the modulator 106 at FIG. 2(C) may be used with the TSD 100 instead. In that case, the two inputs to the modulator 106, $V_{EXT}$ and $V_{BE}$, are compared, and the digitized integral is the output BS. As above, the output of the modulator 106 (BS) is processed by the decimation filter 108, for example, resulting in the measurement output D2a. In this example, D2a can be expressed with the formula:

$$D2a = V_{EXT}/(V_{EXT} + V_{BE}) \quad \text{(Equation 7)}$$

Using the two measurements D1 and D2a from the TSD 100, $\Delta V_{BE}$ can be determined by the formula:

$$\Delta V_{BE} = \{D1/(D2a^*\alpha)\}^*\{(1-D2a)/(1-D1)\}^* V_{EXT}$$
$$= (V_{EXT}/\alpha)^*\{D1/(1-D1)\}^*\{(1-D2a)/D2a\} \quad \text{(Equation 8)}$$

Accordingly, the reference temperature (T) is determined using equations 1 and 1a. The relative errors can be analyzed using the formula:

$$\partial T = \partial \Delta V_{BE} \leq \partial D1/(1-D1) + \partial D2a/(1-D2a) + \partial V_{EXT} + \partial \alpha \quad \text{(Equation 9)}$$

Figure 3:
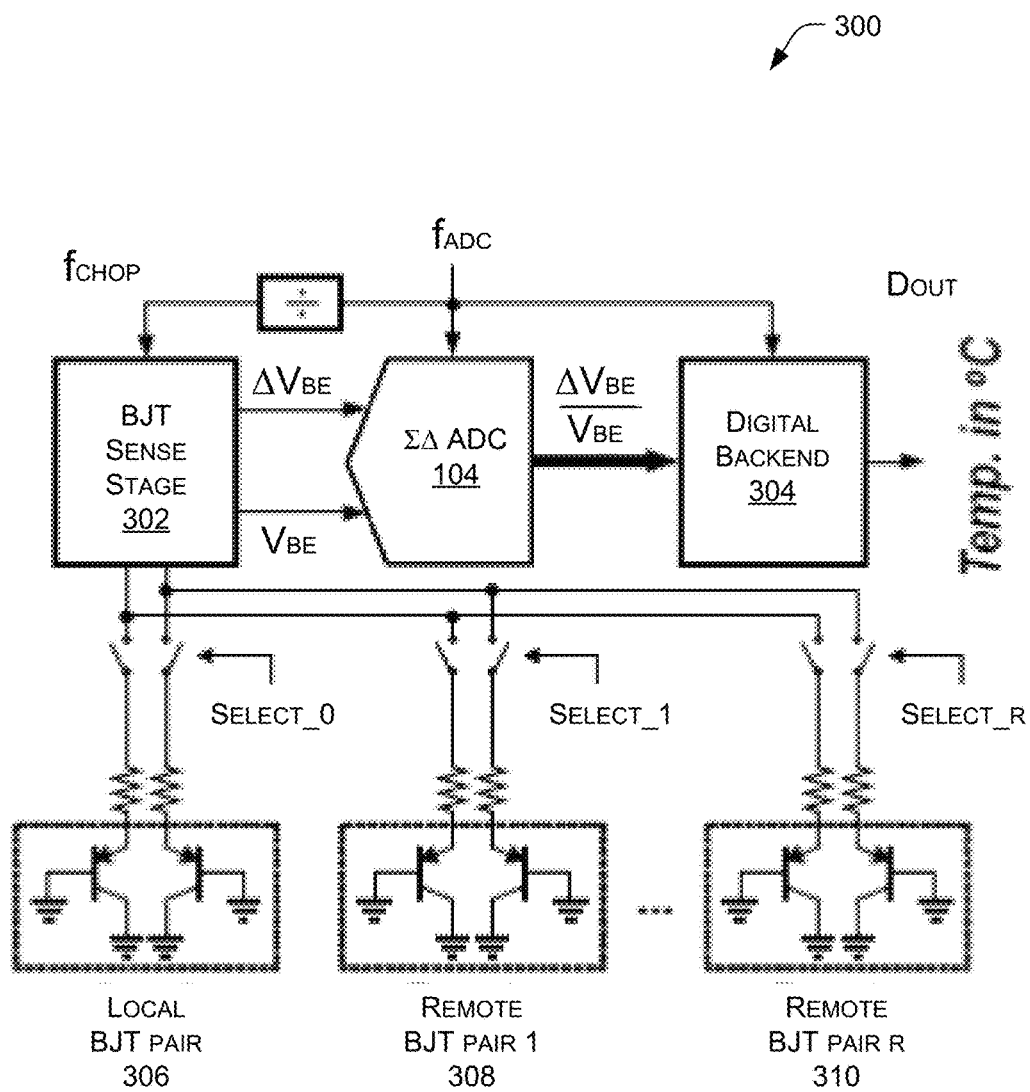
FIG. 3 is a block diagram of an example digital temperature sensor arrangement, according to another implementation.

In another implementation, the value of $\Delta V_{BE}$ is determined by taking two measurement values of $D_{OUT}$ (values D1 and D2) using the TSD 300, as illustrated in FIG. 3. However, as shown in FIG. 3, the reference temperature (T) is determined based on $\Delta V_{BE}/V_{BE}$. In an implementation, the TSD 300 includes a BJT sense stage 302 arranged to detect voltage(s) from the selected BJT pair or pairs (306, 308, 310) based on the ambient temperature of the selected BJT pair(s) (306, 308, 310). The BJT sense stage 302 outputs $\Delta V_{BE}$ and $V_{BE}$ to the ADC 104, based on the voltage(s) detected. The TSD 300 also includes a digital backend 304 arranged to filter and/or otherwise condition the digitized output of the ADC 104.

For the first measurement resulting in output D1, the two inputs $\Delta V_{BE}$ and $V_{BE}$ are processed at the ADC 104, with the resulting value comprising $\Delta V_{BE}/V_{BE}$. This value is digitized at the ADC 104:

$$D1 = \Delta V_{BE}/V_{BE} \quad \text{(Equation 10)}$$

This can be processed at the digital backend 304, forming the measurement output $D_{OUT}$ which is alternate representation of Equation 3.

$$D_{OUT} = \alpha^*(\Delta V_{BE}/V_{BE})/\{\alpha^*(\Delta V_{BE}/V_{BE})+1\} = \alpha^*D1/(\alpha^*D1+1) \quad \text{(Equation 3a)}$$

Figure 4:
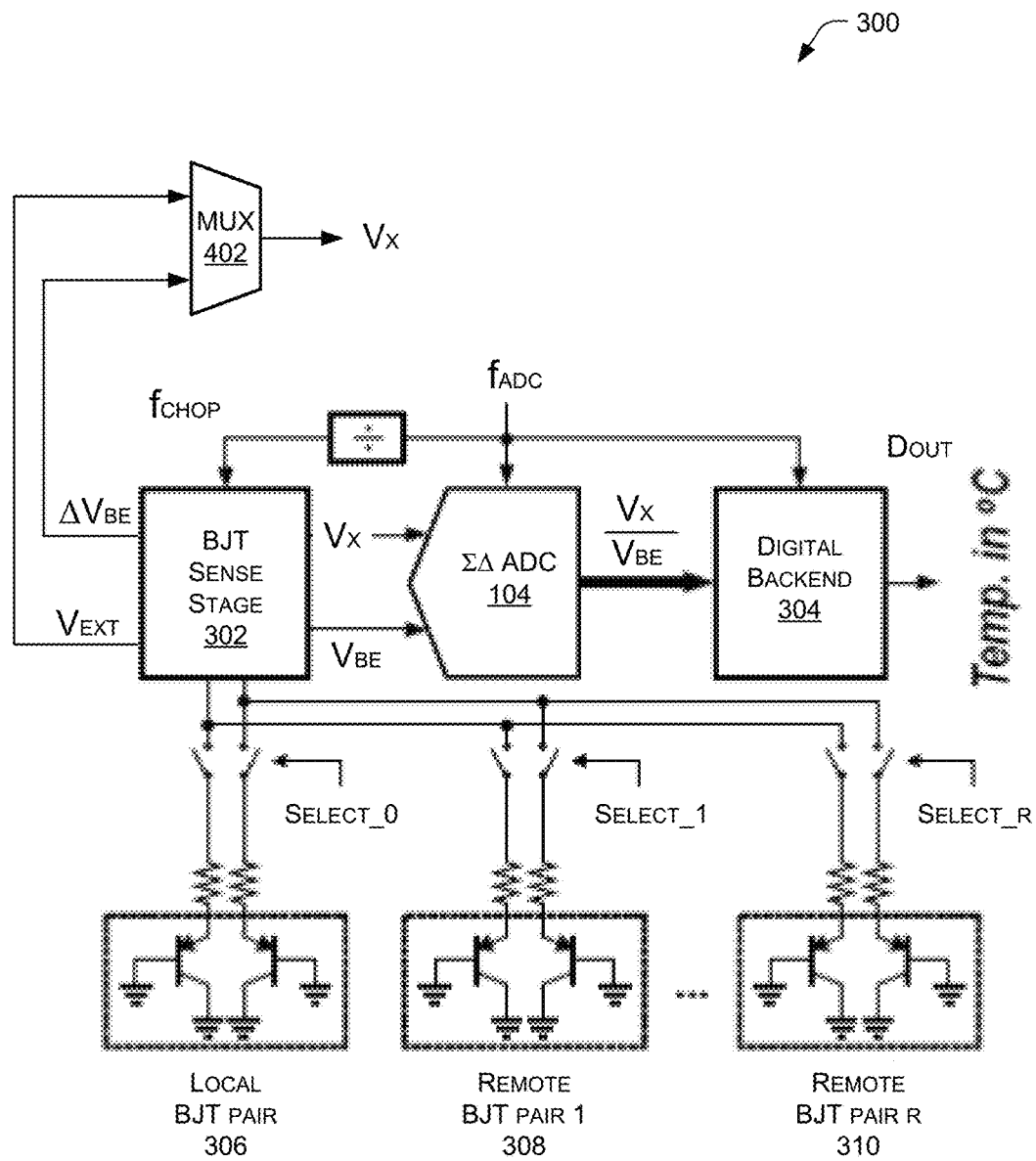
FIG. 4 is a block diagram of the example digital temperature sensor arrangement of FIG. 3, including modifications for additional calibration measurements, according to an implementation.

For the measurement of D2, an external reference voltage $V_{EXT}$ is used as an input to the ADC 104, in substitution for $\Delta V_{BE}$, as shown in FIG. 4. In an implementation, a multiplexer (MUX) 402 (or like circuit) is used with the TSD 300, to determine between inputs $\Delta V_{BE}$ and $V_{EXT}$ for the input opposite $V_{BE}$, for the first (D1) and second (D2) measurements, respectively. As shown, the alternative input signal (i.e., $\Delta V_{BE}$ for D1 and $V_{EXT}$ for D2) is represented by ($V_X$) in the illustration of FIG. 4. $V_{EXT}$ is to be in the expected voltage range of $\Delta V_{BE}$ to avoid ADC 104 going out of range.

For D2, the two inputs $V_{EXT}$ and $V_{BE}$ are processed at the ADC 104, with the resulting value comprising $V_{EXT}/V_{BE}$. This value is digitized at the ADC 104 forming the measurement output D2. D2 can be expressed with the formula:

$$D2 = V_{EXT}/V_{BE} \quad \text{(Equation 11)}$$

Using the two measurements D1 and D2 from the TSD 300, $\Delta V_{BE}$ can be determined by the formula:

$$\Delta V_{BE} = D1^* V_{BE} = D1^* V_{EXT}/D2 \quad \text{(Equation 12)}$$

Accordingly, the reference temperature (T) is determined using equations 1 and 1a. The relative errors can be analyzed using the formula:

$$\partial T = \partial \Delta V_{BE} \leq \partial D1 + \partial D2 + \partial V_{EXT} \quad \text{(Equation 13)}$$

Figure 5:
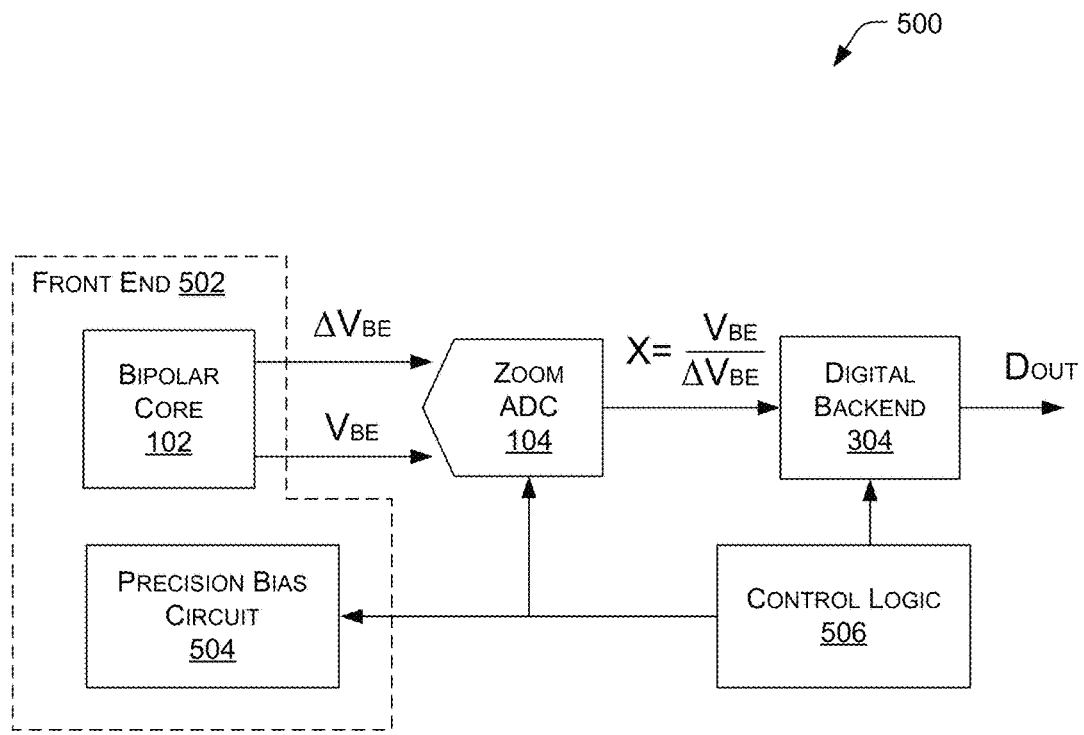
FIG. 5 is a block diagram of another example digital temperature sensor arrangement, according to a further implementation.

In another implementation, the value of $\Delta V_{BE}$ is determined by taking two measurement values of $D_{OUT}$ (values D1 and D2) using the TSD 500, as illustrated in FIG. 5. However, as shown in FIG. 5, the reference temperature T is determined based on $V_{BE}/\Delta V_{BE}$. In an implementation, the TSD 500 includes a front end 502 comprising the bipolar core 102 and a precision bias circuit 504, which provides biasing to the bipolar core 102. The TSD 500 also includes a digital backend 304 and a control logic module 506, arranged to control the ADC 104, the precision bias circuit 504 and the digital backend 304.

As in the TSD 100, the bipolar core 102 of the TSD 500 provides the two inputs ($V_{BE}$ and $\Delta V_{BE}$, in the case of D1 measurement) to the ADC 104, based on the bipolar junction components (or MOS components, etc.) of the bipolar core 102. In an implementation, the output of the ADC 104 is the digital value X, which is equal to $V_{BE}/\Delta V_{BE}$ for measurement D1.

$$D1 = V_{BE}/\Delta V_{BE} \quad \text{(Equation 14)}$$

This can be processed at the digital backend 304, forming the measurement output $D_{OUT}$, which is alternate representation of Equation 3.

$$D_{OUT}=\alpha/\{\alpha+(V_{BE}/\Delta V_{BE})\}=\alpha/(\alpha+D1) \quad \text{(Equation 3b)}$$

Figure 6:
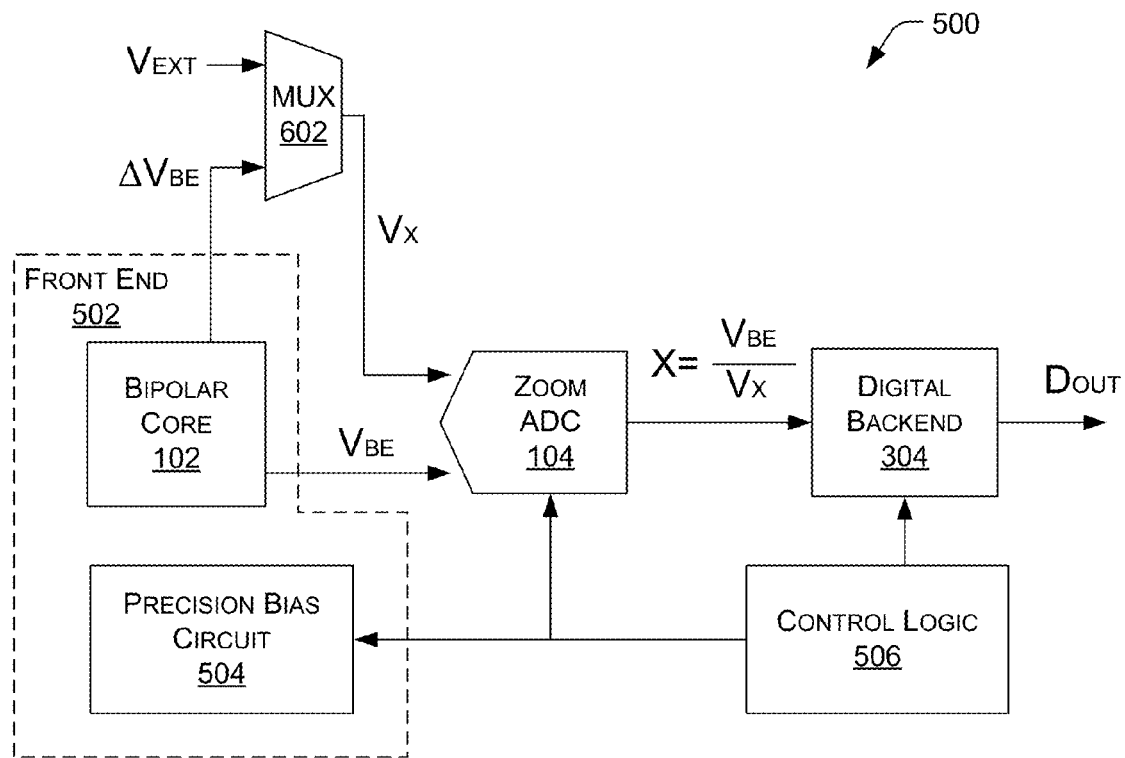
FIG. 6 is a block diagram of the example digital temperature sensor arrangement of FIG. 5, including modifications for additional calibration measurements, according to an implementation.

For the measurement of D2, an external reference voltage $V_{EXT}$ is used as an input to the ADC 104, in substitution for $\Delta V_{BE}$, as shown in FIG. 6. $V_{EXT}$ is to be in the expected voltage range of $\Delta V_{BE}$ to avoid ADC 104 going out of range.

In an implementation, a multiplexer (MUX) 602 (or like circuit) is used with the TSD 500, to determine between inputs $\Delta V_{BE}$ and $V_{EXT}$ for the input opposite $V_{BE}$, for the first (D1) and second (D2) measurements, respectively. As shown, the alternative input signal is represented by ($V_X$) in the illustration of FIG. 6.

For D2, the two inputs $V_{EXT}$ and $V_{BE}$ are processed at the ADC 104, with the resulting value comprising $X=V_{BE}/V_{EXT}$. This value is digitized at the ADC 104 forming the measurement output D2. D2 can be expressed with the formula:

$$D2=V_{BE}/V_{EXT} \quad \text{(Equation 15)}$$

Using the two measurements D1 and D2 from the TSD 500, $\Delta V_{BE}$ can be determined by the formula:

$$\Delta V_{BE}=V_{BE}/D1=V_{EXT}*D2/D1 \quad \text{(Equation 16)}$$

Accordingly, the reference temperature (T) is determined using equations 1 and 1a. The relative errors can be analyzed using the formula:

$$\partial T=\partial \Delta V_{BE} \leq \partial D1 + \partial D2 + \partial V_{EXT} \quad \text{(Equation 17)}$$

Additional Implementations

When used with a TSD 100, 300, or 500 to model the reverse Early effect, the ideality factor (i.e. forward emission coefficient) η is temperature dependent and can be derived to be:

$$1/\eta=1-(V_{th}/V_{BE})*Ln\{1+V_{BE}/V_{AR}\} \quad \text{(Equation 18)}$$

where $V_{th}$ is the thermal voltage (kT/q) and $V_{AR}$ is the reverse Early voltage.

Other derivations are also possible:

$$1/\eta=1-(V_{th}/V_{AR})/\{1+V_{BE}/V_{AR}\} \quad \text{(Equation 18a)}$$

$$1/\eta=1-(V_{th}/V_B) \quad \text{(Equation 18b)}$$

where $V_B$ is a forward bias Early voltage.

Substituting Equation 18 into Equation 1 gives $$V_{th}=kT/q=\Delta V_{BE}/Ln\{N(1+V_{BE}/V_{AR})^{(\Delta V_{BE}/V_{BE})}\}, \text{ and}$$

$$T=(q/k)\Delta V_{BE}/Ln\{N(1+V_{BE}/V_{AR})^{(\Delta V_{BE}/V_{BE})}\} \quad \text{(Equation 19)}$$

Substituting Equation 18a into Equation 1 gives $$V_{th}=kT/q=\Delta V_{BE}/\{Ln(N)+(\Delta V_{BE}/V_{AR})/(1+V_{BE}/V_{AR})\}, \text{ and}$$

$$T=(q/k)\Delta V_{BE}/\{Ln(N)+(\Delta V_{BE}/V_{AR})/(1+V_{BE}/V_{AR})\} \quad \text{(Equation 19a)}$$

Substituting Equation 18b into Equation 1 gives $$V_{th}=kT/q=\Delta V_{BE}/\{Ln(N)+(\Delta V_{BE}/V_B)\}, \text{ and}$$

$$T=(q/k)\Delta V_{BE}/\{Ln(N)+(\Delta V_{BE}/V_B)\} \quad \text{(Equation 19b)}$$

Using Equations 19, 19a, or 19b, the reference temperature (T) can be computed inclusive of the temperature dependent η contribution provided $\Delta V_{BE}$ and $V_{BE}$ are measured electrically for a known $V_{AR}$ or $V_B$.

Another benefit of using a TSD 100, 300, or 500 to take measurements to determine $\Delta V_{BE}$ is that the ideality factor η can be measured using Equation 1a with the temperature (T) measured from Equation 19. This may be expressed as:

$$\eta=\Delta V_{BE}/\{(kT/q)*Ln(N)\} \quad \text{(Equation 20)}$$

This allows verification of the temperature dependence of η with implications for temperature sensor testing and calibration. Additional verification of a temperature sensor may be made by taking electrical measurements of $V_{BE}$ of the temperature sensor.

For example, based on the description of TSD 100 above, $V_{BE}=V_{EXT}*(1-D2a)/D2a$. Based on the description of TSD 300 above, $V_{BE}=V_{EXT}/D2$. Finally, based on the description of TDS 500 above, $V_{BE}=V_{EXT}*D2$.

As mentioned, the TDS 100, 300, and 500 may be implemented similarly with sub-threshold MOS devices using $V_{GS}$ instead of $V_{BE}$ and $\Delta V_{GS}$ instead of $\Delta V_{BE}$. As discussed above, the techniques, components, and devices described herein with respect to the example TSD 100, 300, and 500 are not limited to the illustrations in FIGS. 1-6, and may be applied to other TSD structures, devices, and designs without departing from the scope of the disclosure. In some cases, additional or alternative components may be used to implement the techniques described herein. Further, the components may be arranged and/or combined in various combinations, while remaining within the scope of the disclosure. It is to be understood that a TDS 100, 300, or 500 may be implemented as a stand-alone device or as part of another system (e.g., integrated with other components, systems, etc.).

Representative Process

Figure 7:
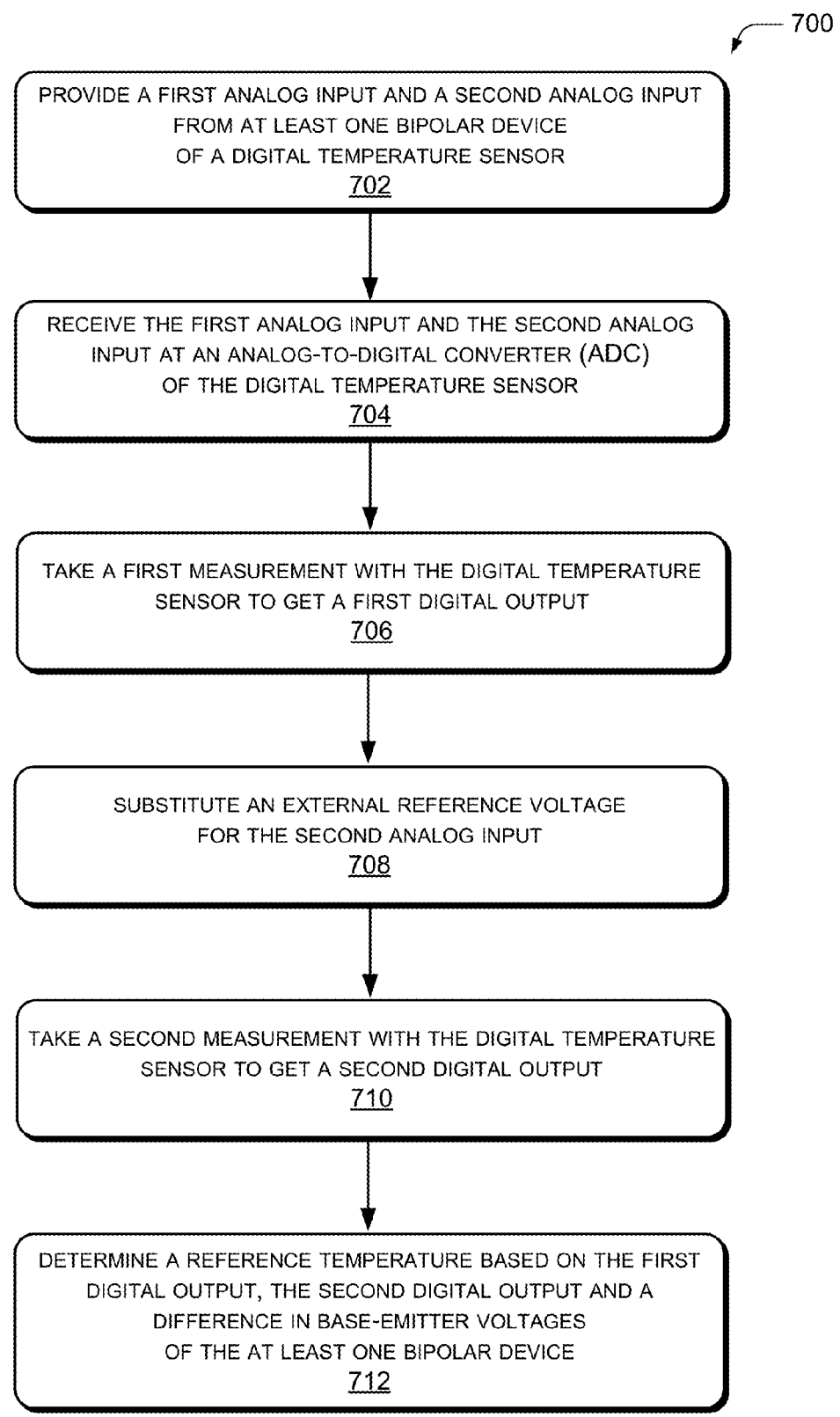
FIG. 7 is a flow diagram illustrating an example process for calibrating a temperature sensor, according to an implementation.

FIG. 7 is a flow diagram illustrating an example process 700 for providing calibration for a temperature sensor, according to an implementation. The process 700 describes using a high-resolution temperature sensor digitizer (TSD) (such as the TSD 100, 300, or 500, for example) to make measurements to form a reference temperature. For example, the reference temperature is determined based on the measurements and a difference in base-emitter voltages of bipolar devices at the TSD. The reference temperature can be compared to a temperature reading of the temperature sensor, for calibration purposes. Additionally, the TSD itself can be calibrated in the same way. The process 700 is described with reference to FIGS. 1-6.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 702, the process includes providing a first analog input and a second analog input from at least one or two bipolar devices of a digital temperature sensor (i.e., temperature sensor digitizer "TSD"). At block 704, the process includes receiving the first analog input and the second analog input at an analog-to-digital converter (ADC) (such as ADC 104, for example) of the TSD.

At block 706, the process includes taking a first measurement with the TSD to get a first digital output (i.e., D1, for example). At block 708, the process includes substituting an external reference voltage for the second analog input. At block 710, the process includes taking a second measurement with the digital temperature sensor to get a second digital output (i.e., D2, for example).

At block 712, the process includes determining a reference temperature based on the first digital output, the second digital output and a difference in base-emitter voltages of the at least one or two bipolar devices (i.e., $\Delta V_{BE}$). In an implementation, the process includes comparing a temperature measured by a temperature sensor under test to the reference temperature to calibrate the temperature sensor under test.

In an implementation, the process includes determining the difference in the base-emitter voltages (i.e., $\Delta V_{BE}$) of the at least one or two bipolar devices based on the first and second measurements. For example, equations 5, 8, 12, or 16 may be used, based on the TSD application. In the implementation, the process includes determining the reference temperature from the difference in the base-emitter voltages of the at least one or two bipolar devices. For example, equations 1 and 1a may be used, once the value of $\Delta V_{BE}$ is known. In various implementations, a processing or computing component, such as a controller, processor, digital logic, or the like, (the control logic 506, for example) may be used to determine the values of $\Delta V_{BE}$ and/or the reference temperature, using the first and second digital outputs and the equations described herein, for instance.

In an implementation, the process includes determining the reference temperature based on the difference in base-emitter voltages of the at least one or two bipolar devices divided by a reference voltage comprising the base-emitter voltage of one of the at least one or two bipolar devices (i.e., $\Delta V_{BE}/V_{BE}$). In the implementation, the process also includes determining the reference temperature based on the external reference voltage divided by the reference voltage comprising the base-emitter voltage of one of the at least one or two bipolar devices (i.e., $V_{EXT}/V_{BE}$).

In an implementation, the process includes determining the reference temperature based on a reference voltage comprising the base-emitter voltage of one of the at least one or two bipolar devices divided by the difference in base-emitter voltages of the at least one or two bipolar devices (i.e., $V_{BE}/\Delta V_{BE}$). In the implementation, the process also includes determining the reference temperature based on the reference voltage comprising the base-emitter voltage of one of the at least one or two bipolar devices divided by the external reference voltage (i.e., $V_{BE}/V_{EXT}$).

In an implementation, the process includes multiplexing the second analog input (i.e., $\Delta V_{BE}$) and the external reference voltage (i.e., $V_{EXT}$) to the ADC, based on whether the first (D1) or second (D2) measurement is being taken, respectively.

In alternate implementations, other techniques may be included in the process in various combinations, and remain within the scope of the disclosure.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An apparatus, comprising:
   one or more bipolar devices arranged to provide a first analog input and a second analog input, wherein the second analog input is based on a difference in base-emitter voltages of the one or more bipolar devices;
   an analog-to-digital converter (ADC) arranged to compare the first analog input and the second analog input; and
   a multiplexer arranged to substitute an external reference voltage for the second analog input, wherein the ADC is further arranged to:
     compare the first analog input and the external reference voltage;
     output a first digital result based on comparing the first analog input and the second analog input;
     output a second digital result based on comparing the first analog input and the external reference voltage; and
     output a third digital result representing a reference temperature based on the first digital result, the second digital result, and the external reference voltage.

2. The apparatus of claim 1, wherein the multiplexer is further arranged to determine which of the second analog input and the external reference voltage to be compared with the first analog input at the ADC.

3. The apparatus of claim 1, further comprising a digital filter component arranged to filter an output of the ADC.

4. The apparatus of claim 1, wherein the one or more bipolar devices comprise bipolar junction transistor devices.

5. The apparatus of claim 1, wherein the one or more bipolar devices comprise sub-threshold metal-oxide-semiconductor transistor devices.

6. The apparatus of claim 1, wherein the first analog input comprises a base-emitter voltage of a bipolar device comprising one of the one or more bipolar devices.

7. The apparatus of claim 1, wherein the first analog input comprises a gate-source voltage of a sub-threshold metal-oxide-semiconductor transistor device comprising one of the one or more bipolar devices, and wherein the second analog input comprises a difference between gate-source voltages of one or more sub-threshold metal-oxide-semiconductor transistor devices comprising the one or more bipolar devices.

8. The apparatus of claim 1, wherein the ADC is arranged to output the third digital result representing the reference temperature based on the first digital result, the second digital result, and an ideality factor, wherein the ideality factor is based on the difference in the base-emitter voltages and a collector current at a known temperature.

9. The apparatus of claim 1, wherein the ADC is arranged to output the third digital result by at least calculating $\Delta V_{BE}$ according to a formula:

$$\Delta V_{BE} = D1 * V_{EXT}/(D2 * \alpha)$$

wherein $\Delta V_{BE}$ is the difference in the base-emitter voltages of the one or more bipolar devices,
wherein $V_{EXT}$ is the external reference voltage,
wherein D1 is the first digital result,
wherein D2 is the second digital result, and
wherein $\alpha$ is a scaling factor applied to $\Delta V_{BE}$.

10. The apparatus of claim 1, wherein the ADC is arranged to output the third digital result by at least calculating $\Delta V_{BE}$ according to a formula:

$$\Delta V_{BE} = (V_{EXT}/\alpha) * \{D1/(1-D1)\} * \{(1-D2a)D2a\}$$

wherein $\Delta V_{BE}$ is the difference in the base-emitter voltages of the one or more bipolar devices,
wherein $V_{EXT}$ is the external reference voltage,
wherein D1 is the first digital result,
wherein D2 is the second digital result, and
wherein $\alpha$ is a scaling factor applied to $\Delta V_{BE}$.

11. The apparatus of claim 1, wherein the ADC is arranged to output the third digital result by at least calculating $\Delta V_{BE}$ according to a formula:

$$\Delta V_{BE} = D1 * V_{EXT}/D2$$

wherein $\Delta V_{BE}$ is the difference in the base-emitter voltages of the one or more bipolar devices,
wherein $V_{EXT}$ is the external reference voltage,
wherein D1 is the first digital result,
wherein D2 is the second digital result, and
wherein α is a scaling factor applied to $\Delta V_{BE}$.

12. The apparatus of claim 1, wherein the ADC is arranged to output the third digital result by at least calculating $\Delta V_{BE}$ according to a formula:

$$\Delta V_{BE} = V_{EXT} * D2/D1$$

wherein $\Delta V_{BE}$ is the difference in the base-emitter voltages of the one or more bipolar devices,
wherein $V_{EXT}$ is the external reference voltage,
wherein D1 is the first digital result,
wherein D2 is the second digital result, and
wherein α is a scaling factor applied to $\Delta V_{BE}$.

13. A method, comprising:
providing a first analog input and a second analog input from at least one bipolar device of a digital temperature sensor, wherein the second analog input is based on a difference in base-emitter voltages of the at least one bipolar device;
receiving the first analog input and the second analog input at an analog-to-digital converter (ADC) of the digital temperature sensor;
taking a first measurement with the digital temperature sensor to get a first digital result;
substituting an external reference voltage for the second analog input;
taking a second measurement with the digital temperature sensor to get a second digital result;
determining the difference in the base-emitter voltages of the at least one bipolar device based on the first digital result and the second digital result; and
determining a reference temperature based on the difference in the base-emitter voltages of the at least one bipolar device.

14. The method of claim 13, further comprising multiplexing the second analog input and the external reference voltage to the ADC, based on whether the first or second measurement is being taken.

15. The method of claim 13, further comprising determining the reference temperature based on the difference in base-emitter voltages of the at least one bipolar device divided by a reference voltage comprising the base-emitter voltage of one of the bipolar devices.

16. The method of claim 15, further comprising also determining the reference temperature based on the external reference voltage divided by the reference voltage comprising the base-emitter voltage of the at least one bipolar device.

17. The method of claim 13, further comprising determining the reference temperature based on a reference voltage comprising the base-emitter voltage of the at least one bipolar device divided by the difference in base-emitter voltages of the at least one bipolar device.

18. The method of claim 17, further comprising also determining the reference temperature based on the reference voltage comprising the base-emitter voltage of the at least one bipolar device divided by the external reference voltage.

19. The method of claim 13, further comprising comparing a temperature measured by a temperature sensor to the reference temperature to calibrate the temperature sensor.

20. The method claim 13, wherein the bipolar device comprises sub-threshold metal-oxide-semiconductor (MOS) devices, referencing the gate-source voltage ($V_{GS}$) of the MOS devices.

21. The method of claim 13, further comprising determining the reference temperature inclusive of a temperature dependent ideality factor q contribution using electrical measurements of $\Delta V_{BE}$ and $V_{BE}$, wherein $\Delta V_{BE}$ is the difference in base-emitter voltages of the at least one bipolar device, and wherein $V_{BE}$ is a reference voltage comprising the base-emitter voltage of the at least one bipolar device.

* * * * *